United States Patent [19]
Heywang et al.

[11] 3,786,224
[45] Jan. 15, 1974

[54] METHOD FOR PRODUCING STRIPS OF INSULATING MATERIAL HAVING ELECTRICALLY CONDUCTIVE COATINGS WITH A COATING FREE MARGINAL EDGE SURFACE

[75] Inventors: Hermann Heywang; Gerhard Hoyler, both of Munich, Germany

[73] Assignee: Siemens Aktiengesellschaft, Berlin Germany

[22] Filed: July 21, 1971

[21] Appl. No.: 164,667

[30] Foreign Application Priority Data
July 23, 1970 Germany.................. P 20 36 663.6

[52] U.S. Cl............... 219/121 LM, 29/620, 269/57
[51] Int. Cl............................................ B23k 27/00
[58] Field of Search.................. 219/121 L, 121 EB, 219/68; 269/57; 29/620; 117/8; 82/29 A

[56] References Cited
UNITED STATES PATENTS

| 3,217,088 | 11/1965 | Steierman.................... 219/121 LM |
| 3,663,795 | 5/1972 | Myer.............................. 219/121 L |
| 3,259,730 | 7/1966 | Wehde et al................. 219/121 LM |
| 3,530,573 | 9/1970 | Helgeland.................... 219/121 LM |
| 3,486,221 | 12/1969 | Robinson..................... 219/121 LM |

*Primary Examiner*—J. V. Truhe
*Assistant Examiner*—George A. Montanye
*Attorney*—Carlton Hill et al.

[57] ABSTRACT

The present invention is directed to a method and device for removing a coating such as a metalized coating from a coated surface of a strip of insulative material by utilizing a laser beam which is directed parallel to the coated surface with its focal point position adjacent to the portion of the coated surface to be removed. Preferably the strip is either coiled in a roll with the edge portions forming a frontal surface and the roll is rotated with respect to the laser beam and shifted in a plane perpendicular to the axis of the laser beam or the strips are arranged in stacks and the laser beam and the stack are moved relatively in a back and forth direction and in a direction vertical to the back and forth direction to decoat the coated surface adjacent the edge of the strip.

13 Claims, 3 Drawing Figures

PATENTED JAN 15 1974   3,786,224
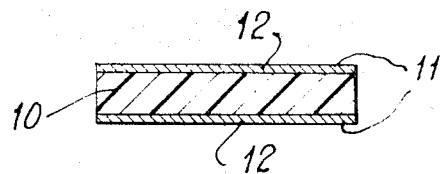
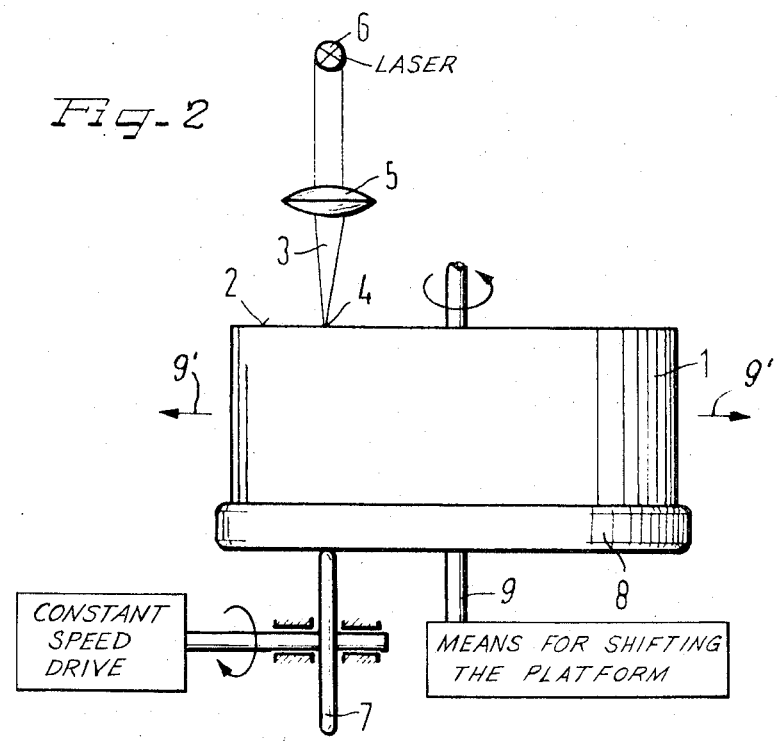
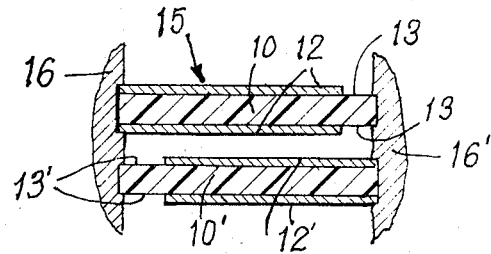
INVENTORS
Hermann Heywang
Gerhard Hoyler

METHOD FOR PRODUCING STRIPS OF INSULATING MATERIAL HAVING ELECTRICALLY CONDUCTIVE COATINGS WITH A COATING FREE MARGINAL EDGE SURFACE

BACKGROUND OF THE INVENTION

1. Field of the Invention

The present invention relates to a method in a device for producing a strip of insulative material supporting an electrical conductive coating of either metal or carbon which strip has a coating free longitudinally extending margin portion at one edge.

2. Prior Art

In the manufacture of self-healing capacitors, two or more strips or webs of insulating material with each strip having at least one coated surface which is provided with an electrically conductive coating of either metal or carbon and with a margin edge portion of each coated surface being free of the coating are arranged in a stack or wound in a coil with the edges of the strips forming a pair of frontal surfaces and with the margin or edge portion free of the coating of adjacent strips facing an opposite directions. To individually connect the coated surfaces of adjacent strips to separate terminals, each of the pair of frontal surfaces are metalized with the metal of the metalizing coating on one frontal surface being in electrical contact with the coated surfaces of a strip and insulated by the margin or edge portions of the adjacent strip.

Many methods have been proposed for producing a strip or web of an insulative material having electrically conductive coating which strip has a longitudinally extending edge portion which is free of the coating. For example the strip of insulative material can have the coating applied by evaporation process and have the portion which is to be free of the coating masked or screened either by traveling belts or by being covered with an oil or other material which prevents the evaporated coatings from adhering to the strip. In another method, the entire surface of the web or band is coated with the electrically conductive coating, and, subsequently, a portion of the coating is removed by either mechanical means such as being wiped off of the strip, or by being evaporated by an electrical arc method. In each of these prior art methods, the width of the web or strip is substantially greater than what is necessary for the ultimate assembly or arrangment into the capacitor. Thus, the webs which is for example twice the width necessary for formation of the capacitor is provided with the longitudinal extending portion free of the coating adjacent the center of the web and is subsequently longitudinal cut with a cutting tool guided along the center of the previously produced longitudinal portion free of the coating. The width of the marginal edge portion which is free of the coating produced by the cutting operation may not be within the required tolerances due to errors in positioning the cutting tool during the cutting operation.

In recent years it has been proposed to use a laser for processing materials such as cutting or machining a work piece. A laser beam can be applied for producing at high temperatures in the work piece by the absorption of the radiation at a very small or locally limited area of the workpiece. This increase in the temperature can be used for melting, evaporatting, welding, cutting or boring a workpiece. It also is known to use a laser for equalizing precision resistors by trimming the resistor elements. In these prior art methods, the laser beam is directed vertically onto the surface to be machined or processed. Since the laser beam is directed vertically at the surface being processed approximately 90 percent of the laser beam is reflected by the surface and not absorbed by the surface and thus the heat produced by the absorption of the radiation or beam is reduced and results in a very low efficiency for the process.

In view of the use for removing material from a workpiece, it has been suggested to use a laser for the purpose of removing a portion of the coating on a web to produce the edge portions free of the coating. Since the web or strip of insulative material having the coated surface of the electrical conductive coating are wound into rolls after the application of the coating and since the prior art methods of machining workpieces with a laser beam require the directing of the beam perpendicular to the surface to be processed, the strip with the surface coating must be uncoiled during the laser machining operation and then recoiled. Furthermore as mentioned above, the efficiency of such a machining operation using a laser beam is reduced because of the high reflection of the laser beam.

SUMMARY OF THE INVENTION

The present invention is directed to an improvement in a method and apparatus for removing a portion of an electrically conductive coating from a strip or web of insulative material by directing the laser beam substantially parallel to the coated surface with the focal point of the laser beam positioned at the portion where the coating is to be removed and moving the laser beam and strip relative to one another to subject each increment of the portion of the coated surface to the laser beam for short duration, less than $10^{-5}$ seconds, so that the portion of the coating subjected to the laser beam is heated to evaporate the coating from the surface of the web. The laser beam can either be a continuously applied beam or a pulse laser beam in which the amount of movement is such that the distance between adjacent focal points of successive pulses overlap. In one embodiment of performing the method, the strips are arranged in a stack and the stack of strips and the laser beam are moved relatively in both a first direction extending along the length of the strips and a second direction extending perpendicular to the first direction. Another embodiment of the method and the device for performing this embodiment, the strip is wound into a coil or roll having an axis which is shifted relative to the laser beam as the roll is rotated with the speed of rotation being changed so that the rate of travel of the strip with respect to the laser beam remains constant.

Accordingly it is an object of the present invention to provide a method and device for removing a portion of an electrical conductive coating from a strip of material.

Another object of the present invention is a method and device for removing a coating from a portion of the coated surface by using a laser beam having its axis substantially parallel to the coated surface to increase the efficient of the coating removal process.

A still further object of the present invention is to provide a device for rotating a roll of the strip of material with respect to the laser beam with the strip moving at a constant rate of travel.

Other objects, features and advantages of the invention will be readily apparent from the foregoing description of the preferred embodiments taken in conjunction with the accompanying drawings although various modifications may be effected without departing from the spirit and scope of the novel concepts of the disclosure.

BRIEF DESCRIPTION OF THE DRAWINGS

FIG. 1 is a cross sectional view of a strip of material provided with a coating prior to the performance of the treatment by the present invention.

FIG. 2 is a schematic diagram of an apparatus for carrying out the method of the present invention; and FIG. 3 is a partial cross sectional view of a self-healing capacitor utilizing the strips produced by the present invention.

DESCRIPTION OF THE PREFERRED EMBODIMENTS

The principles of the present invention are particularly useful for treating a strip or web of insulative material 10, which has one or more coated surfaces 11 having a coating or a layer 12 of electrical conductive material such as metal or carbon deposited thereon to remove a portion of the coating or layer 12 adjacent an edge of the strip 10 to provide longitudinally extending edge or margin portion 13 which is free of the electrically conductive layer 12.

The strip 10 produced by the method and apparatus of the present invention along with a similar strip 10' (FIG. 3) having electrical conductive layers 12' and edge portions 13' free of the electrical conductive layers are formed into a self-healing capacitor 15 by either winding the strips into a coil or arranging the strips 10 and 10' in a stack with the edge portion 13 of a strip 10 facing in an opposite direction from the edge portions 13' of the strip 10'. To separately connect the layers 12 of the strip 10 to one electrical source and the layers 12' of the strip 10' to another electrical source, electrical terminals 16 and 16' are provided respectively. As illustrated, the terminals 16 and 16' are formed by metalizing the frontal surfaces formed by the edges of the strips 10 and 10' as they are either wound into the coil or arranged in a stack to form the self-healing capacitor 15. The layers 12 of the strip 10 are in electrical contact with the metalized layer 16 while they are insulated from the metalized layer 16' by the edge portions 13 which are free of the coating or layer 12. In a similar manner, the layer 12' of the strip 10' are in electrical contact with the metalized layer 16' and are insulated from the metalized layer 16 by the portions 13' which are free of the electrical conductive layers 12'. A self-healing coil 15 can be impregnated with an oil and include an insulating layer placed between the webs 10 and 10' as they are arranged to form the capacitor 15.

To remove a portion of the electrically conductive layer or coating 12 from the band or web 10, a laser beam is directed on an increment of the portion of the layer to be removed with the axis of the beam being substantially parallel to the coated surface 11. The beam of the laser is preferably focused with the focal point being located in the area of the coating 12 which is to be removed. The workpiece formed by the strip 10 and the laser beam are shifted relative to each other with the amount of shifting being such that each increment of the portion of the layer 12, which is being removed, is subjected to the beam for a short duration of time less than $10^{-5}$ seconds to heat the increment of coating to evaporate it from the strip 10.

The laser beam utilized for removing the coating can be either from a laser producing a continuous laser beam or from a pulse laser. If the laser is a pulse laser, the amount of movement between successive pulses is such that the focal points of the successive pulses will have a partial overlap and the pulsing of the laser is such that the laser beam is applied for a very short time interval which is also less than $10^{-5}$ seconds at each increment of the coating to be removed. The wave length of the laser beam is selected to be absorbed by the coating 12 but not absorbed by the material of the insulative strip of web 10 so that the absorption of the beam causes localized heating of the layer 12 to cause the vaporation of the layer to create the portion 13 free of the coating. While the coating 12 is being removed by vaporization, the strip 10 is not damaged due to the fact that it is uneffected by the radiation of the laser beam of that particular wave length.

In removing a portion of the coating 12 to form the portions 13 adjacent from the edge which are free of coating, a plurality of strips 10 having coating 12 in one or more surfaces 11 may be arranged in a stack. The edges of the strips 10 form a frontal surface for the stack which is substantially planar. A laser beam is directed at the frontal surface to be substantially perpendicular to the plane thereof and the stack and beam are moved relatively in a first and second direction preferably with the stack being moved relative to the laser beam which is fixed in a stationary position. The movement of the stack in the first direction is along the length of the strip 10 with the beam directed closely adjacent to the portion of the coating 12 to be removed. After completing the movement, the stack is shifted in the second direction perpendicular to this first direction and a second sweep is made on the stack to remove the next layer 12 to produce the next edge portion 13. Thus the movement between the stack and laser can be described as a first movement which is in a back and forth motion with a second movement being a stepping movement in a direction perpendicular to the back and forth movement to shift the next layer to be vaporized into the focal area of the laser beam.

Instead of forming the strips 10 into the stack, a continuous strip can be wound into a coil or roll with its edges forming frontal surfaces. In FIG. 2, a device for performing the invention on a coil or supply roll 1 of the strip or web 10 having at least one coating 12. The edge of the strip 10, which is to have the coating 12 removed therefrom, forms the frontal surface 2 and a focused laser beam 3 is projected onto the frontal surface 2. The laser beam 3 is produced from a solid state laser 6 which is focused by an optical system illustrated by a lens 5 to produce a focal point 4 which lies in the area where the coating 12 is to be removed. The laser beam as directed extends substantially along an axis perpendicular to the frontal surface 2 or at a very slight angle thereto so that the beam extends substantially parallel to the metal surfaces 12 of the strip 10 forming the supply roll 1.

The supply roll 1 is supported by a mounting means which is platform 8 that is rotated about an axis 9 by a drive wheel 7 to move the strip 10 forming the supply roll 1 with respect to the laser beam 3. During the rotation of the supply roll 1, the beam 3 and the platform 8 are shifted in the direction of the arrows 9' to change the distance between the axis of rotation of the platform 8 and the laser beam. Preferably, the laser beam 3 is substantially stationary and the platform 8 while rotated by the drive wheel 7 has its axis of rotation 9 shifted with respect to the beam by means for shifting the platform. In order to move the strip 10 at a constant speed with respect to the beam 3, the drive wheel 7 which is connected to a constant speed drive, is mounted in a fixed position and engages the bottom of the platform 8 beneath the laser beam 3 so that as the platform is shifted with respect to the laser beam 3 it is also shifted with respect to the drive wheel to change the distance of the contact of the wheel and platform from the axis of rotation 9 to change the angular speed of rotation of the platform 8 and to maintain the linear speed of the strip 10 forming the supply roll 1 constnat. Thus, the circumferential speed of the drive wheel 7 will be the same as the speed of movement of the strip 10 of the supply roll 11 which is disposed beneath the laser beam 3.

The directing of the laser beam 3 into the supply roll 1 of the strip 10 causes a decoating of the strip 10 to form the edge portion 13. The efficiency of the operation is greatly increased over the prior art laser evaporation process due to the greater absorption by the layer 12. Unlike the prior art laser decoating or machining processes, in which the laser beam is directed substantially perpendicular to the surface to be machine and has a high percentage of the beam reflected by the surface, the present method with the beam extending parallel or at a slight angle to the surface being decoated has a greater efficiency because the portion of the laser beam or impulse which is reflected by the first impact point is guided into the depth between the two coated surfaces respectively by means of the multiple reflection and is subsequently absorbed by the metal layer 12.

While a continuous laser beam can be utilized with the beam being moved relative to the surface being decoated, preferably, a pulsing laser beam is utilized with the amount of movement between pulses of such an order that successive focal points of the pulse between successive pulses are closely adjacent or slightly overlapped. The wave length of the laser is selected with respect to the material forming the insulative strip or web such as polyethylene terephthalate or polycarbonate do not absorb the radiation of the laser and therefore are not damaged by the machining operation; however, the wave length of 1.06 $\mu$ will be absorbed by the electro conductive coating 12 such as a metal coating or carbon coating to cause heating and local vaporization for removing the coating in the area adjacent to the focal point of the laser beam. Furthermore damage to the insulating material forming the strip or web is not caused by heat conductively from the increment of which is subjected to the laser beam for short time which is less than $10^{-5}$ seconds and maybe a duration as short as 20 nanoseconds ($20 \times 10^{-9}$ seconds).

An example of this insulative strip or web having the coating 12 comprises the material of the strip being of either polyethylene terephtalate or polycarbonate which strip is coated by an evaporated metalizing process with aluminum on one side having a surface conduction of 0.4 Siemens or mho. A laser beam produced by a YAG giant pulse laser having a neodymiun dope yttrium aluminum garnet produces a wave length of 1.06 $\mu$ is used and the laser beam as directed parallel to the metalized surface with the focal point of the beam lying at the portion of the coating to be removed or adjacent thereto. In such a process the aluminum coating on the surface of the plastic insulating strip or web can be removed to provide a longitudinally extending margin edge portion free of the coating having a width in the range of 0.1 millimeters to 0.5 millimeters.

Although various modifications might be suggested by those versed in the art it should be understood that we wish to embody within the scope of the patent warranted hereon all such modifications which resonably and properly come within our contribution to the art.

We claim:

1. In a method for producing a strip of insulative material having an electrical conductive coating on a surface thereof with a portion of the surface adjacent an edge of the strip being free of the coating by coating the entire surface of the strip with an electrical conductive coating to provide a coated surface and subsequently removing the coating from a portion of the coated surface at an edge thereof to form an edge portion free of the coating, the improvement in the method of removing the coating comprising directing a laser beam substantially parallel to said coated surface with the focal point of the laser beam positioned at said edge of the coated surface, the wave length of the laser beam being absorbed by the coating but not absorbed by the material of the insulating strip or web and moving the laser beam and strip relative to one another to subject each increment of said edge of the coated surface to the laser beam for a short duration of less than $10^{-5}$ seconds whereby the portion of the coating subjected to the laser beam is heated to evaporate the coating from the surface to provide the edge portion free of the coating.

2. In a method according to claim 1, wherein the step of relatively moving comprises moving the strip with respect to the laser beam.

3. In a method according to claim 1, wherein the laser beam is applied as a pulsing laser beam and wherein the rate of relative movement between the strip and the laser beam is such that the focal points of successive pulses on said portion overlap.

4. In a method according to claim 3, wherein the pulsing laser beam is produced by a YAG giant pulse laser and has a wave length of 1.06 $\mu$.

5. A method according to claim 1, wherein prior to removing a portion of the coated surface, the method includes winding the strip with the coated surface about an axis to form a roll having the edges of the strip forming substantially planar frontal surfaces, and wherein the step of moving during the removing of a portion of the coated surface includes moving the roll and the laser beam relative to each other with the laser beam being substantially parallel to the axis of the roll, and wherein the step of directing the laser beam includes positioning said focal point at said planar frontal surfaces.

6. In a method according to claim 5, wherein the step of relative moving of the laser beam and roll comprises rotating the roll about its axis and axially shifting the laser beam and the roll relative to each other.

7. In a method according to claim 6, wherein the step of rotating the roll includes changing the speed of rotation of the roll of the wound strip as the laser beam and roll are being axially shifted relative to each other so that the rate of movement of the wound strip of insulative material relative to the laser beam remain substantially constant.

8. In a method according to claim 7, which includes maintaining the laser beam substantially stationary and wherein the step of shifting comprises shifting the axis of the roll of wound insulative strip with respect to the stationary laser beam as the roll is being rotated.

9. In a method according to claim 1, in which prior to the step of removing a portion of the coated surface, the method includes the step of stacking the strip of insulative material having the coated surface with additional strips of insulative material having coated surfaces with the edges of the strips forming a frontal surface, and wherein the moving of the laser beam relative to the strip comprises relative moving the stack of strips and the laser beam, and wherein the step of directing the laser beam includes positioning said focal point at said frontal surface.

10. In a method according to claim 9, wherein the step of relative moving the laser beam and the stack of strips comprises a step of moving in a first direction parallel to the length of the strips and a step of moving in a second direction perpendicular to the first direction and the length of the strips between successive steps of moving in the first direction.

11. In a method according to claim 10, which includes maintaining the laser beam in a stationary position and the steps of moving comprises moving said stack of strips in both the first direction of movement and the second direction of movement with respect to the stationary laser beam.

12. A device for use in removing a coating from an edge portion of a coated surface of an insulative strip by applying a laser beam directed substantially parallel to the coated surface of the strip comprising a platform being supported for rotation about an axis and having a planar surface extending perpendicular to said axis for supporting a roll of the strip, means for providing a laser beam, means supporting the laser beam means in a stationary position with the laser beam directed substantially perpendicular to the planar surface and substantially parallel to said axis of rotation of the platform, means to adjust the focal point of the laser beam in a direction perpendicular to said planar surface, means for shifting the axis of rotation of the platform with respect to the laser beam, a drive wheel, and means for rotating the drive wheel at a constant speed, said drive wheel being mounted in a fixed position relative to the laser beam to engage the platform and to rotate the platform at a variable angular speed as the means shifting the axis of rotation of the platform shifts the platform relative to the drive wheel and laser beam.

13. A device according to claim 12, wherein the drive wheel of a constant speed is positioned to engage the platform at a position below the focal point of the laser beam.

* * * * *